(No Model.)

J. TILLOTSON.
METHOD OF MAKING RIVET STUDS.

No. 321,260. Patented June 30, 1885.

Witnesses:
George T. Dewey
Lucius W. Briggs.

Inventor:
Joseph Tillotson,
By J. C. Dewey,
Att'y.

UNITED STATES PATENT OFFICE

JOSEPH TILLOTSON, OF WORCESTER, MASSACHUSETTS, ASSIGNOR TO A. H. HAMMOND, OF SAME PLACE.

METHOD OF MAKING RIVET-STUDS.

SPECIFICATION forming part of Letters Patent No. 321,260, dated June 30, 1885.

Application filed April 24, 1885. (No model.)

*To all whom it may concern:*

Be it known that I, JOSEPH TILLOTSON, a subject of the Queen of Great Britain, residing in Worcester, in the county of Worcester and State of Massachusetts, have invented certain new and useful Improvements in the Art or Method of Forming Metallic Studs or Rivets; and I do hereby declare that the following is a full, clear, and exact description of my invention, which, in connection with the drawings forming a part of this specification, will enable others skilled in the art to which my invention belongs to make and use the same.

My invention relates to an improved method of forming rivets or studs, as will be hereinafter fully described, and the nature thereof indicated by the claim.

Figure 1:
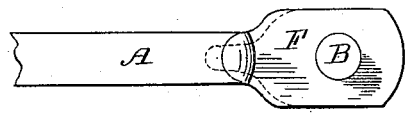
Figure 2:
Figure 3:
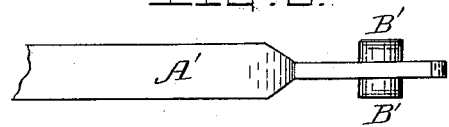
Figure 4:
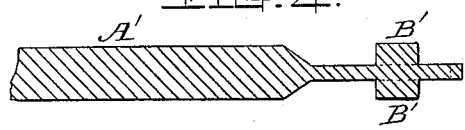
Figure 5:
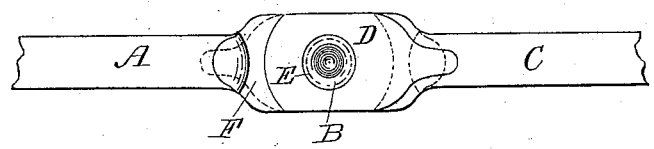
Figure 6:
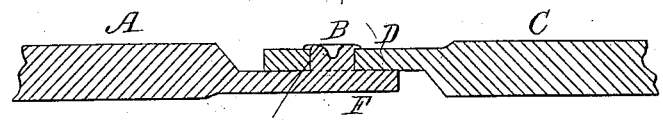

Referring to the drawings, Figure 1 is a top or plan view of a piece of metal upon or out of which a stud or pin is formed by my improved method to be hereinafter described. Fig. 2 is a side view of the part shown in Fig. 1, showing the stud in elevation. Fig. 3 is a side view of a piece of metal having a stud or pin formed upon opposite sides thereof by my improved method. Fig. 4 is a central longitudinal section through the part shown in Fig. 3. Fig. 5 is a top or plan view of the piece of metal shown in Fig. 1 riveted or attached to another piece of metal, and Fig. 6 is a central longitudinal section through the parts shown in Fig. 5.

In the accompanying drawings, the part marked A is a piece of comparatively soft metal. B is the stud or rivet, formed directly out of the piece A, and integral with it, in the following manner: The end of the piece A, or any part thereof where it is desired to form the stud B, upon one side is compressed between hard surfaces, preferably metallic surfaces, one of which has a hole in it corresponding to the size of the stud or rivet to be formed. Into this hole a portion or part of the metal of the piece A projects or extends, while all around it it is compressed or flattened out, substantially as shown at F in the drawings.

I have shown in the drawings the piece A, with the stud B formed thereon in the manner above explained, riveted or attached to another piece of metal, C. This piece C is flattened or compressed at its end, as shown at D, and a hole, E, punched through it, into which the stud or rivet B extends. The top of the rivet is headed or spread by the usual means in any well-known manner, thus attaching or connecting the pieces A and C together.

I have shown in Figs. 3 and 4 of the drawings a piece of metal, A', having studs or pins B' B' formed upon opposite sides thereof. The method of forming the studs B' B' is similar to the method hereinbefore explained for forming the stud B upon one side or surface of the piece A, the piece A' being compressed between hard surfaces having holes therein, into which the metal projects or extends to form the studs or pins B' B' upon opposite sides of the piece A', the metal all around said studs or pins being compressed or flattened, substantially as shown in Figs. 3 and 4.

The value of my invention will be readily appreciated by those skilled in the art to which it belongs, for by my improved method one or more studs, or pins, or rivets may be formed upon any surface, in the manner hereinbefore explained, furnishing a means for connecting this piece or surface with any other piece or surface by fitting the stud or studs so formed into a corresponding hole or holes in the other piece or surface, and in case it is desired to rivet the pieces or surfaces together the end of the stud or rivet is spread or enlarged.

By my invention no surplus material is required for the studs or rivets, for they are a part of the piece or surface out of which they are formed and integral with it; but the surface is not weakened by removing any material from it, as it would be if the stud or rivet were struck up out of it, leaving an opening or hole where the material to form the stud or rivet was taken from.

I have shown in the drawings pieces of round wire to illustrate my invention; but my improved method of forming studs or rivets may be employed or used in connection with any surfaces to form one or more studs or rivets thereon, in the manner hereinbefore described, and without regard to whether the surface is to be riveted to another surface, or simply connected therewith by the stud fitting into a corresponding hole therein.

Having thus described my improved method of forming studs or rivets, what I claim therein as new, and desire to secure by Letters Patent, is—

The improved method of forming or making a stud or studs upon a piece of metal or other surface hereinbefore described—namely, compressing the metal or material between hard surfaces, one or more of which have a hole or holes therein, into which the metal extends to form the stud or studs—substantially as set forth.

JOSEPH TILLOTSON.

Witnesses:
JOHN C. DEWEY,
GEORGE T. DEWEY.